(12) United States Patent
Walter et al.

(10) Patent No.: US 7,821,691 B2
(45) Date of Patent: Oct. 26, 2010

(54) ZERO-ORDER DIFFRACTIVE FILTER

(75) Inventors: Harald Walter, Kilchberg (CH); Gilbert Gugler, Marly (CH); Alexander Stuck, Wettingen (CH); Robert Beer, Marly (CH); Marc Pauchard, Fribourg (CH)

(73) Assignee: CSEM Centre Suisse d'Electronique et de Microtechnique SA—Recherche et Développement, Neuchatel (CH)

( * ) Notice: Subject to any disclaimer, the term of this patent is extended or adjusted under 35 U.S.C. 154(b) by 460 days.

(21) Appl. No.: 11/880,874

(22) Filed: Jul. 24, 2007

(65) Prior Publication Data

US 2008/0225391 A1    Sep. 18, 2008

Related U.S. Application Data

(63) Continuation-in-part of application No. 11/827,143, filed on Jul. 10, 2007.

(30) Foreign Application Priority Data

Jul. 28, 2006    (EP)    .................... 06015757

(51) Int. Cl.
    *G03H 1/00*    (2006.01)
(52) U.S. Cl. .............. 359/2; 359/569; 385/37
(58) Field of Classification Search ........ 359/2, 359/562, 569, 571, 576; 385/37
See application file for complete search history.

(56) References Cited

U.S. PATENT DOCUMENTS

| 4,484,797 | A | 11/1984 | Knop et al. |
|---|---|---|---|
| 6,204,202 | B1 | 3/2001 | Leung et al. |
| 6,773,771 | B1 | 8/2004 | Ashida et al. |
| 2002/0186950 | A1 | 12/2002 | Mule' et al. |
| 2005/0085585 | A1 | 4/2005 | Quinn et al. |
| 2006/0078696 | A1 | 4/2006 | Furholz et al. |
| 2009/0257126 | A1* | 10/2009 | Walter et al. ........ 359/568 |

FOREIGN PATENT DOCUMENTS

| DE | 10020346 A1 | 11/2000 |
|---|---|---|
| EP | 1394574 A2 | 3/2004 |
| EP | 1464511 A2 | 6/2004 |
| EP | 1655348 A1 | 5/2006 |
| GB | 2416738 A | 2/2006 |

(Continued)

OTHER PUBLICATIONS

Rosenblatt, D. et al., "Resonant Grating Waveguide Structures" IEEE Journal of Quantum Electronics 33, 1997, p. 2038-2059.

(Continued)

*Primary Examiner*—Alessandro Amari
(74) *Attorney, Agent, or Firm*—Weingarten, Schurgin, Gagnebin & Lebovici LLP (57) ABSTRACT

A Zero-order diffractive filter comprising a first layer (1) with a periodic diffractive microstructure, forming a waveguide, and at least one adjacent second layer (2, 4, 5), wherein said first layer (1) has a refractive index that is higher than the refractive index of said second layer (2, 4, 5) by at least 0.2. At least one of said second layers (2, 4, 5) is a porous layer comprising nanopores. The period Λ of the diffractive microstructure is between 100 nm and 3000 nm.

34 Claims, 5 Drawing Sheets

FOREIGN PATENT DOCUMENTS

WO     WO 98/51747     11/1998

OTHER PUBLICATIONS

Gale, M.T., "Zero-Order Grating Microstructures" in R.L. van Renesse, Optical Document Security, 2$^{nd}$ Ed., pp. 267-287.

Zimmerman et al., J. Mater. Res., vol. 8, No. 7, 1993, 1742-1748.

Tsutsui et al., "Doubling Coupling-Out Efficiency in Organic Light-Emitting Devices Using a Thin Silica Aerogel Layer," Adv. Mater. 13, 2001, p. 1149-1152.

\* cited by examiner

ZERO-ORDER DIFFRACTIVE FILTER

CROSS REFERENCE TO RELATED APPLICATIONS

This application is a continuation-in-part application under §1.53(b) of prior application Ser. No. 11/827,143 filed Jul. 10, 2007, entitled ZERO-ORDER DIFFRACTIVE FILTER; which claimed priority under 35 USC §119(a)-(d) to European Application No. 06 015757 filed Jul. 28, 2006, the whole of which are each hereby incorporated herein by reference. Priority to each of these applications is herein claimed.

TECHNICAL FIELD

The present invention relates to Zero-order Diffractive filters (ZOF), to methods of manufacturing Zero-order Diffractive filters, to the use of such ZOFs and to the use of specific materials for manufacturing ZOFs.

STATE OF THE ART

Zero-order diffractive filters, also called resonant gratings, are well known, and described e.g. in D. Rosenblatt et al, "Resonant Grating Waveguide Structures" IEEE Journal of Quantum Electronics 33, 1997, p. 2038-2059 and M. T. Gale, "Zero-Order Grating Microstructures" in R. L. van Renesse, Optical Document Security, 2nd Ed., pp. 267-287.

Typically, ZOFs are made of a waveguiding layer having diffractive microstructures with a period that is usually smaller than the wavelength of light. Examples of such microstructures are parallel or crossed grating lines. The waveguiding layer is made of a material with relatively high refractive index $n_{high}$ surrounded by material with lower refractive index $n_{low} \leq n_{high}$. The materials surrounding the waveguide can have different indices of refraction.

Figure 1:
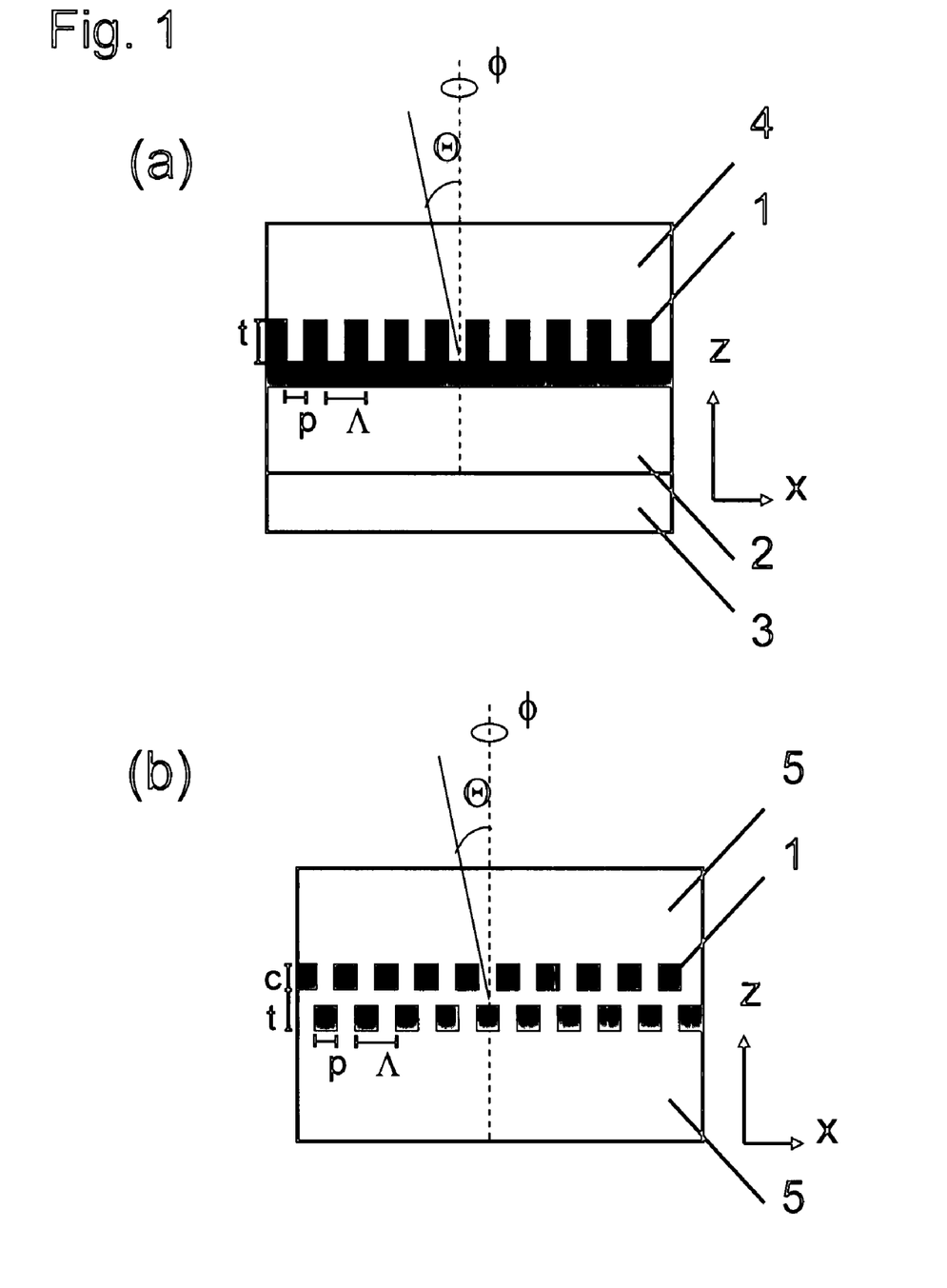
FIG. 1 shows schematic cross sections of two possible structures of a ZOF.

Examples of possible structures of ZOFs are given in FIGS. 1(a) and (b), showing a schematic cross section through a ZOF. Black symbolizes a material with high index of refraction, while white symbolizes a material with low index of refraction. The ZOF of FIG. 1(a) comprises a substrate 3, of which only the uppermost part is shown. The thickness of the substrate 3 normally exceeds the thickness of the other layers. A layer 2 with low index of refraction is arranged on substrate 3 and in turn carries the waveguiding structure 1. The waveguiding structure 1 can optionally be covered by a covering layer 4. In FIG. 1(b) a waveguiding structure layer 1 is embedded in a surrounding second layer respectively matrix 5.

Such ZOFs, when illuminated by polarized or unpolarised polychromatic visible light, are capable of separating zero diffraction order output light from higher diffraction order output light. The micro-structured, high-refractive index layer 1 acts as a leaky waveguide. A part of the incident light is directly transmitted and a part is diffracted and then trapped in the waveguiding layer 1. Some of the trapped light is rediffracted out of the waveguide such that it interferes with the transmitted part. At certain wavelengths and angular orientations resonance occurs, which leads to complete destructive interference. That means no such light is transmitted. Thus, ZOFs show characteristic reflection and transmission spectra, depending inter alia on the viewing angle and the orientation of the grating lines with respect to the observer. Parameters influencing the color effect are, for example, the period $\Lambda$ of the microstructure, the thickness c of the high refractive index layer, the grating depth t, the grating trough width p, the fill factor (or duty cycle) f.f.=p/$\Lambda$ the shape of the microstructure (e.g. rectangular, sinusoidal, triangular or more complex), and the indices of refraction of the materials used (see FIG. 1). The waveguiding layer, as well as any further layer coming into contact with the incoming light, such as the layers adjacent thereto, has to be substantially transparent (which means transmission T>50%, preferably T>90%), at least in a part of the visible spectral range. In state of the art ZOFs the period $\Lambda$ lies in the range of 100 nm to 1000 nm, typically between 300 nm to 500 nm ("sub wavelength structure"). As long as the materials used show no absorption, the transmission spectra are the complement of the reflection spectra. A characteristic feature of such ZOFs is a color effect—e.g. color change upon tilting and/or rotation, in particular upon rotation. Supposing a non-normal viewing angle $\Theta$, for example $\Theta=30°$, and grating lines parallel to the plane containing the surface normal and the viewing direction, one reflection peak can be measured which splits symmetrically into two peaks upon rotation. A well-known example of such a 90° rotation effect is a color change from red to green (one peak moves from the red to the green part of the spectrum, a second peak moves from the red part to the invisible infrared part).

U.S. Pat. No. 4,484,797 describes color filters with zero-order microstructures (ZOF), their manufacturing and their use as authenticating devices. Illuminated even with non-polarized, polychromatic light such devices show unique color effects upon rotation and therefore can be clearly identified. As production methods embossing of a thermoplastic substrate followed by a vacuum based coating technique are described. ZnS is used for the waveguiding layer.

The waveguiding layers of known ZOFs require the use of materials with a high refractive index, typically above 2.0. Inorganic materials posses such high refractive indices, while typical organic materials, such as polymers, posses refractive indices in the range of 1.5. However, inorganic materials have disadvantages, such as high costs, incompatibility with simple manufacturing processes, and the like.

SUMMARY OF THE INVENTION

An object of the present invention is to provide ZOFs with improved properties and/or lower manufacturing costs than compared to the state of the art, and to provide a method for manufacturing such ZOFs.

These and other objectives are achieved by a ZOF according to the invention, and the manufacturing methods according to the invention, as defined by the independent claims. Further advantageous embodiments are given in the dependent claims.

ZOFs according to the invention essentially can have similar structures as ZOFs known from the prior art, e.g. the exemplary structures of FIGS. 1(a) and (b). The waveguiding structure 1 must have a refractive index that is at least 0.2 higher than the refractive index of the second layer 2, in order to obtain the necessary waveguiding properties. In a ZOF according to the invention the difference in the refractive index of the layers 1, 2, 4, 5 is the result of nanoparticles and/or nanopores, located in at least one of these layers. Said nanoparticles and/or nanopores affect the refractive index of the corresponding layer. The size of the particles or pores is advantageously of sub-wavelength size, in order to minimize optical scattering.

The application of nanoparticles or nanopores to affect the refraction index allows to circumvent the use of inorganic materials with high index of refraction, with their drawbacks mentioned above, and to use simple standard coating techniques. Surprisingly it was also found that the use of very low index of refraction materials, such as porous layers in ZOFs, results in visible zero-order color effects even if the period of the gratings is above 1000 nm, which was not possible up to now.

BRIEF DESCRIPTION OF THE DRAWINGS

The present invention will be explained by reference to the following figures:

In FIG. 5(a) the parameters used are period Λ=360 nm, viewing angle Θ=30° and indices of refraction of the surrounding material of 1.59, and of the waveguide layer of 2.39.

In FIG. 5(b) the parameters used are period Λ=360 nm, viewing angle Θ=30° and indices of refraction of the surrounding material of 1.29 and of the waveguide layer of 2.09. Black denotes low reflectance, bright high reflectance.

In FIG. 5(c) the parameters used are period Λ=360 nm, viewing angle Θ=30° and indices of refraction of the surrounding material of 1.09 and of the waveguide layer of 1.89. Black denotes low reflectance, bright high reflectance.

In FIG. 5(d) the parameters used are period Λ=590 nm, viewing angle Θ=30° and indices of refraction of the surrounding material of 1.09 and of the waveguide of 1.89. Black denotes low reflectance, bright high reflectance.

WAYS TO IMPLEMENT THE INVENTION

The present invention will be described in more detail below. It is understood that the various embodiments, preferences and ranges as provided/disclosed in this specification may be combined at will. Further, depending of the specific embodiment, selected definitions, embodiments or ranges may not apply. Unless otherwise stated, the following definitions shall apply in this specification:

The term 'waveguiding' layer is known in the field. To fulfill its function in a ZOF, a waveguiding layer has at least one diffractive microstructure in its surface or on its surface, a refractive index typically at least 0.2 higher when compared with the adjacent layers, is substantially transparent at least in part of the visible light, and has sharp interfaces to the adjacent layer(s). Substantially transparent are layers with a transmission T>50%, preferably T>90%; at least in a part of the visible spectral range. A sharp interface according to this invention is less than 200 nm thick, preferred less than 80 nm thick, particularly preferred less than 30 nm thick. The interface is the zone between two layers where the refractive index changes from the value of one layer to the value of the other layer. Preferably, the waveguiding layer has one diffractive microstructure in one of its surfaces.

The term 'diffractive microstructure' is known in the field. Such microstructures are characterized by the period Λ, the structure depth t, the grating trough width p, the fill factor (or duty cycle) f.f.=p/Λ, and the shape of the microstructure (e.g. rectangular, sinusoidal, triangular or more complex, preferably rectangular). In a ZOF according to the invention the period Λ is preferably between 100 nm and 3000 nm, particularly preferably between 300 nm and 1700 nm. Preferably the microstructures are linear or crossed gratings.

The term 'grating lines' is known in the field. The shape of the grating lines defines the microstructure. Typically, linear lines are used.

All values for the 'refractive index' are determined for a wavelength of 550 nm. Unless otherwise stated, a high refractive index of a layer refers to the fact that the adjacent layers have a lower refractive index; and vice versa. Further, it is understood that, in line with physical principles, the minimum refractive index is 1.0. Thus, reference to a refractive index of e.g. "lower than 1.5" always implies "lower than 1.5 but at least 1.0".

The term 'nanoparticles' is used to designate particles having a typical diameter $d_p$ in the nanometer range, such as between some few nm and several 100 nm, preferably between 5 nm and 200 nm, particularly preferred between 10 nm and 60 nm. The size of the nanoparticles is determined by high-resolution imaging methods like transmission-electron-microscopy (TEM) or scanning-electron-microscopy (SEM). Preferably, the particle size distribution should be "low"; this means that preferred 90% of the particles are smaller than $2 \times d_p$ and less than 1% of the particles are larger than $3 \times d_p$.

The term 'nanopores' is used to designate pores having a typical diameter in the nanometer range, such as between some few nm and several 100 nm. Such nanoparticles or nanopores typically have a diameter smaller than the wavelength of visible light, thereby not giving rise to scattering.

The term 'coating' is well known in the field; it denotes a covering that is applied to an object (i.e. the substrate or layer(s) covering the substrate). They may be applied as liquids ("liquid coating"). If the liquid is a water-based solution or dispersion, the term "water based coating" is employed. Such coating techniques include dip coating, rod coating, blade coating, gravure coating, curtain or cascade coating, spray coating.

Figure 4:
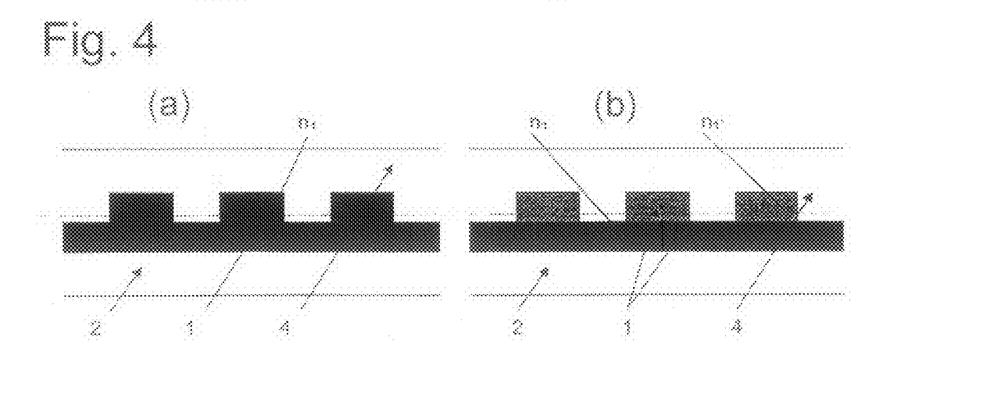
FIG. 4 shows a schematic cross section of a ZOF according to the invention with a waveguiding layer including a microstructure in the surface (a) or on its surface (b).

FIG. 4 shows a schematic cross section of a ZOF according to the invention with a waveguiding layer including a microstructure in the surface (a) or on its surface (b). In case of the embodiment of FIG. 4(a), the structured and the unstructured part of the waveguiding layer 1 have the same refractive index $n_1$, while in the case of FIG. 4(b) the structured and the unstructured part of the waveguiding layer may have different refractive indices $n_1$ and $n_1'$. The second layer 2, being adjacent to waveguiding layer 1, has a refractive index $n_2 < n_1$, thereby forming a refractive index step suitable for forming the border of a waveguiding structure.

The structured part has refractive index $n_1'$, and the unstructured part has refractive index $n_1$. The refractive index $n_4$ of the covering layer 4 is smaller than the refractive indices of the waveguiding structures 1, $n_4 < n_1'$ and $n_4 < n_1$. The embodiment of FIG. 4(a) is preferable, due to its simpler manufacturing. To achieve the necessary differences in the refractive index, one or more of the layers 1, 2, 4 can contain nanopores or nanoparticles.

In one advantageous embodiment, the second layer 2 comprises nanopores. Said nanopores lead to a decrease of the average refractive index, well below a typical refractive index that can be achieved by a prior art bulk material. In an even more advantageous embodiment, the nanopores are formed by the gaps in a layer consisting of agglomerated nanoparticles.

Alternatively or in addition the first layer, the waveguiding structure 1, contains nanoparticles in a matrix. If said nanoparticles have a higher refractive index than the layer bulk matrix, the overall refractive index will be increased.

In a further advantageous embodiment of a ZOF according to the invention, the waveguiding layer 1 is arranged on a substrate 3, as shown in FIGS. 3(a) and (b). The waveguiding layer 1 comprises nanoparticles, in order to increase the refractive index. A covering layer 4 is placed on top of the waveguiding structure.

Substrate 3 is optionally releasable, i.e. it can be removed from the layer or layer stack, e.g. by breaking an adhesive bond between substrate 3 and the adjacent layer. This is particularly useful since it allows to remove the (potentially thick) substrate once that the optically active assembly of layers 1, 2, 4, 5 has been positioned, e.g. on a security document. Hence, in a further advantageous embodiment the substrate is released from or releasably attached to said ZOF. Advantageously, the first layer deposited on the substrate is a release-layer and the top layer is an adhesive layer, preferably a thermo-activateable adhesive layer. Such release-layers and adhesive layers are known to the skilled person.

In European patent application No. 06015757, the convention priority of which is claimed for this application, the period Λ of the microstructures is said to have values between 100 nm and 1000 nm. Meanwhile embossing tests with larger periods surprisingly showed that such larger periods are also capable of generating useful color effects if the waveguide layer is adjacent to a material with a low index of refraction at least on one side. Simulations confirmed these findings. Thus the use of the low index of refraction materials leads to very different filter characteristics than previously known from the state in the art.

Figure 5:
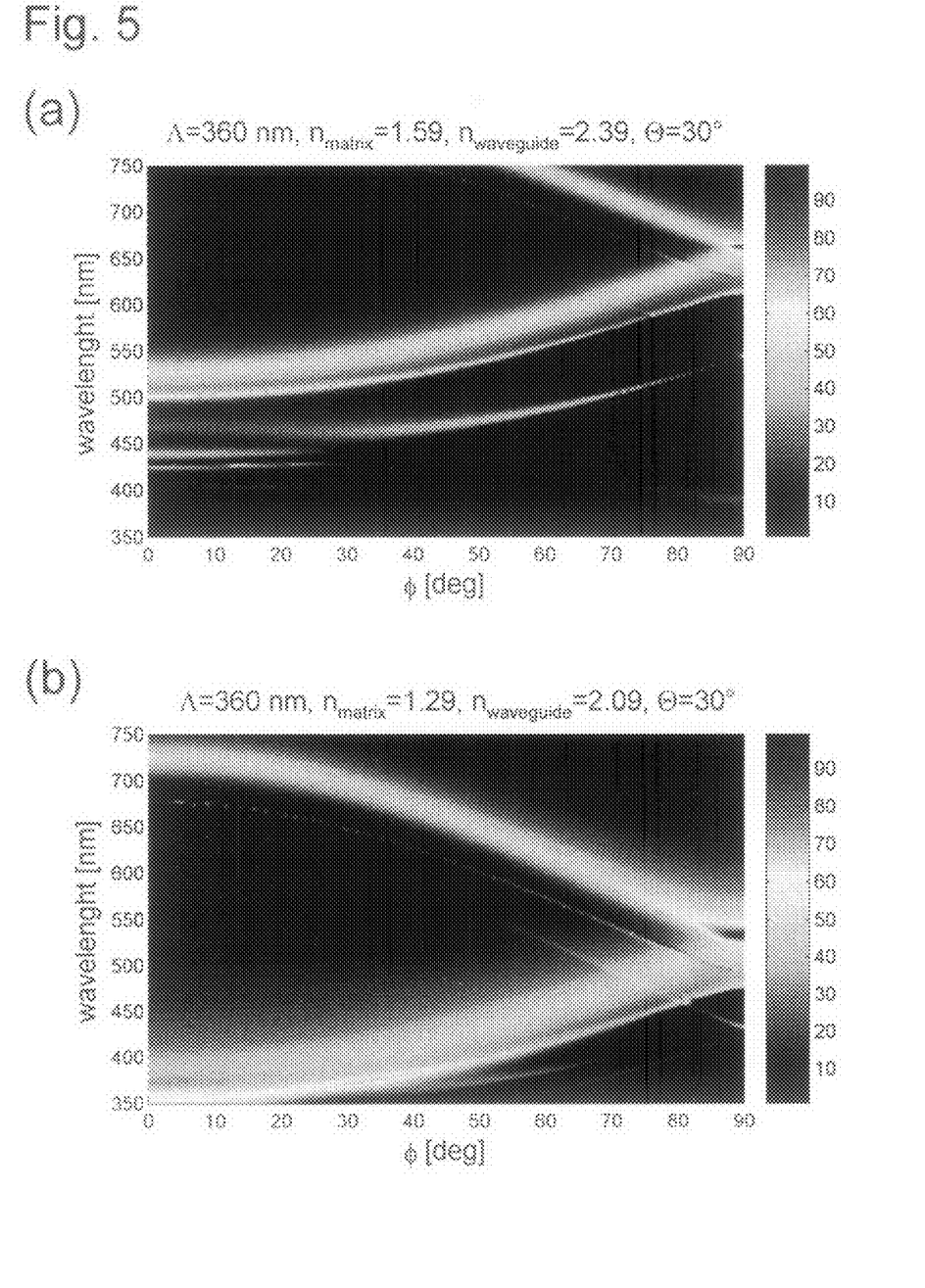
FIG. 5 shows simulated reflectance value maps (in percentages) as a function of rotation angle φ (x-axis) and wavelength (y-axis) for a ZOF with a structure as shown in FIG. 1(b). Black denotes low reflectance, white denotes high reflectance.

FIG. 5(a) shows a simulation of the reflection of a ZOF, illuminated with white light at an angle of $\Theta=30°$, as a function of the reflected wavelength and the viewing rotation angle in relation to the grating lines. The structure of the filter is shown in FIG. 1(b). The waveguiding layer is embedded in a matrix 5 with index of refraction $n_{matrix}=1.59$. The index of refraction of the waveguiding layer 1 is $n_{waveguide}=2.39$. The period is Λ=360 nm, the grating depth is t=130 nm and the thickness of the waveguiding layer is c=100 nm. Rotation angle $\phi=0°$ denotes a viewing direction perpendicular to the grating lines, and $\phi=90°$ a viewing direction parallel to the grating lines. As can be seen the reflection peak at $\phi=0°$ is in the wavelength range of 500-550 nm, resulting in a green color impression. The peak shifts to 625-675 nm for $\phi=90°$ which results in a red color impression. Below $\phi=90°$ a second peak is present, which shifts to the near infra red (NIR) spectral range.

The reflection characteristics are shifted to shorter wavelengths by reducing both indices of refraction by 0.3 and keeping all other parameters constant as can be seen in FIG. 5(b). Further the shape of the reflection peak changes. For example the slope of the peak to longer wavelengths is shallower.

Figure 6A:
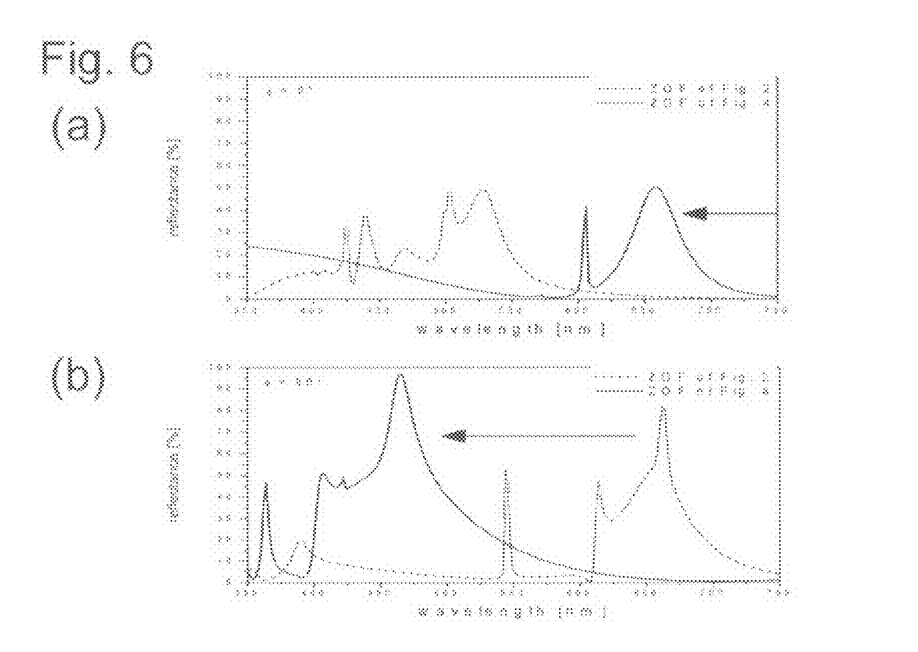
FIG. 6: Reflection spectra of the ZOF shown in FIGS. 5(a) and (c), at (a) φ=0° and (b) φ=90°. The black line represents the spectrum corresponding to FIG. 5(c), while the dotted line represents the spectrum of FIG. 5(a). The shift of the maximum peaks is indicated by black arrows.

Further decreasing the indices of refraction by 0.2 ($n_{matrix}=1.09$, $n_{waveguide}=1.89$) shifts the reflection peaks to even shorter wavelengths, as shown in FIG. 5(c). Such a ZOF shows a color change from red to blue by rotating the filter from $\phi=0°$ to $\phi=90°$. FIG. 6 shows the reflection spectra of the ZOF shown in FIGS. 5(a) and (c) at (a) $\phi=0°$ and (b) $\phi=90°$. The black line is the spectrum corresponding to FIG. 5(c), while the dotted line represents the spectrum of FIG. 5(a). The shift of the maximum peaks is indicated by black arrows.

Figure 5E:
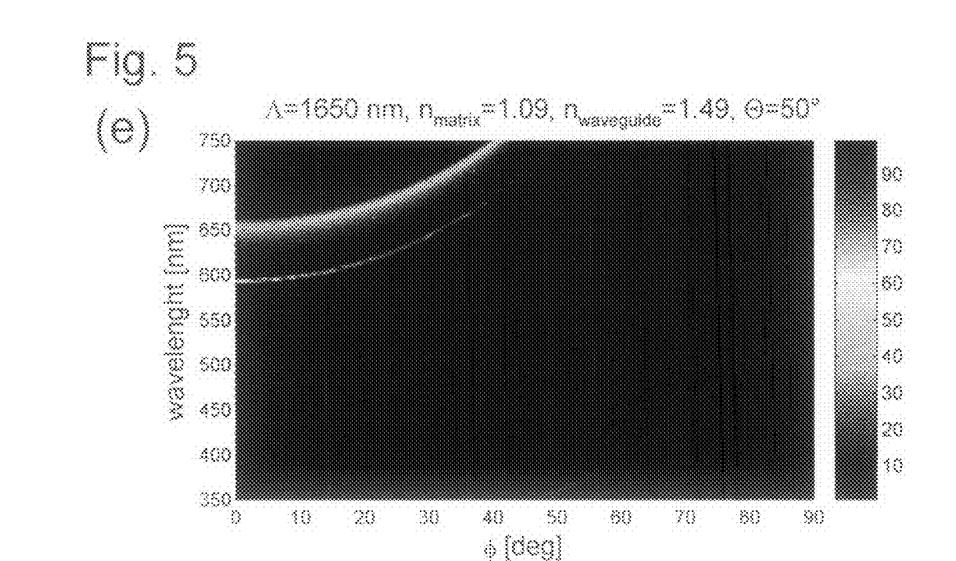
In FIG. 5(e) the parameters used are period Λ=1650 nm, viewing angle Θ=50° and indices of refraction of the surrounding material of 1.09 and of the waveguide layer of 1.49. Black denotes low reflectance, bright high reflectance.

If the period of the microstructure is increased to 590 nm, a color effect similar to the one shown in FIG. 5(a) results with a ZOF with refraction indices as used for the ZOF in FIG. 5(c). The corresponding simulation spectra are shown in FIG. 5(d). Thus the low index of refraction of the matrix 5 and the waveguide layer 1 enables the use of larger grating periods for zero order color filters. With the structure shown in FIG. 1 even very large microstructure periods lead to a visible color effects. FIG. 5(e) shows the reflection characteristics for such a ZOF with viewing angle $\Theta=50°$, period Λ=1650 nm, index of refraction of the matrix $n_{matrix}=1.09$ and index of refraction of the waveguide layer $n_{waveguide}=1.49$. As can be seen, this ZOF shows a color change from red to invisible (resp. near infrared) by rotation of the ZOF from $\phi=0°$ to $\phi=90°$.

It thus can be stated that ZOFs based on micro-structured waveguiding layers embedded in a matrix of low index of refraction can produce reflection peaks in the visible and/or near infrared spectral range with periods up to 3000 nm. Such index of refractions, however, may only be achieved by use of the porous materials and/or nanoparticles containing materials described in the following.

Material of the Layers of a ZOF According to the Invention

The materials used for manufacturing the different layers of ZOFs according to the invention will be described in detail in the following.

As it will become clearer throughout this specification, the nanoparticles as described herein can serve two different purposes:
 i) as a component of a porous layer, to provide material with an overall low refractive index; and/or
 ii) as a component of a waveguiding layer 1, to provide material with an overall high refractive index.

A waveguiding layer 1 in a ZOF according to the invention may be made from a water soluble, thermoplastic polymer. Examples of suitable polymers are selected from the group consisting of unmodified natural polymers, modified natural polymers, and synthetic polymers, including partly or completely hydrolyzed polyvinyl alcohol PVA and co-polymers with vinyl acetate and other monomers; modified polyvinyl alcohols; homo- or co-polymers of (meth)acrylamide; polyethylene oxide PEO; polyvinyl pyrrolidone PVP; polyvinylacetate; stark; cellulose and its derivatives, like hydroxyethylcellulose or carboxymethylcellulose; gelatine; polyurethane PU. The aforementioned polymers can also be used as mixtures (blends), whereby preferably two of the aforementioned polymers are blended. Preferred polymers are modified PVA, polyvinylidenfluoride, PEO, copolymers of (meth)acrylamid and polyacrylnitrile or their mixtures. PVA for example has a refractive index of about 1.50 and a glass transition temperature in the order of 85° C.

Optionally, the organic polymers as described above may be cross-linked during or after a coating process, with appropriate agents. This may be done for example to form nearly water insoluble layers. Examples of organic cross-linking agents are aldehydes, dioxans, epoxides and reactive vinyl compounds. Inorganic cross-linking agents are for example chrome alum, aluminum sulfate or boric acid. Other possible agents are UV active molecules. Further, US2005/0085585 A1 describes a cross-linkable PVA and its use for the production of ophthalmic devices. The cross-linking agents mentioned for hardening the porous layer as described below are suitable likewise. Said polymers and cross-linking agents are commercially available or obtainable according to known methods.

In another variant the waveguiding layer 1 is made up by water dispersible, thermoplastic polymer particles. During an embossing step said polymer particles are transformed to a continuous layer 1, bearing a diffractive microstructure, as illustrated in FIG. 2(b). Advantageously, hydrophobic, dispersible polymer particles are used, as the waveguiding layer is not affected, e.g. swollen, by an additional coating with an aqueous solution. Thus, additional hardening of the layer after the embossing step is not necessary. Examples of suitable polymer particles are polyethylene PE, polypropylene PP, polytetrafluoroethylene PTFE, polyamide PA, polyester, PU, Latex, acrylnitrile, polymethylmethacrylate PMMA, polystyrol PS or paraffin wax, e.g. polysperse (Lawter, Belgium).

Advantageously, the size of the water dispersible, thermoplastic polymer particles is between 20 nm and 5000 nm, preferably between 40 nm and 1000 nm, and particularly preferred between 50 nm and 500 nm.

Advantageously, the glass-transition temperature of the polymer particles is between 30° C. and 170° C., preferred between 50° C. and 110° C.

The polymer particles as described in this embodiment may be mixed with binders. Suitable binders are water soluble, thermoplastic polymers as mentioned above. Preferred binders are selected from the group of PVA.

The water dispersible, thermoplastic polymer particles and binders are commercially available or obtainable according to known methods.

In a further embodiment of this invention, the waveguiding layer 1 comprises either water dispersible, thermoplastic polymer particles or water soluble, thermoplastic polymers (as described above), and nanoparticles with a refractive index that is higher than the one of the polymer material. Examples of such inorganic nanoparticles are PbS, $TiO_2$, $SiO_2$, $Al_2O_3$ and $ZrO_2$. For example, Zimmermann et. al. J. Mater. Res., Vol. 8(7), 1993, 1742-1748, discloses compositions comprising PbS nanoparticles and gelatin, having refractive indices of up to 2.5. Such compositions are suitable for forming waveguiding layers of ZOF's according to the invention. Preferably, the size of the nanoparticles is in the range of 5 nm to 200 nm, particularly preferred between 10 nm and 60 nm. Furthermore, the particle size distribution should preferably be low.

During the manufacturing of a ZOF, the microstructure is typically applied to the waveguiding layer, for example by embossing. Such a manufacturing is for example shown in FIG. 2(a), where a microstructure is embossed on the waveguiding layer 1, adjacent to a second layer 2; and in FIG. 3(a), where the waveguiding layer 1 is directly adjacent to a substrate 3.

However, if the waveguiding layer 1 comprises nanoparticles that increase the refractive index of said layer, it is possible to apply the diffractive microstructure either on the waveguiding layer, e.g. by embossing the waveguiding layer 1, as shown in FIG. 3(a), or in the waveguiding layer 1, by embossing the adjacent support 3 prior to coating the support with the waveguiding layer, as shown in FIG. 3(b).

The mass thickness of the waveguiding layer is preferably in the range of 50 nm to 1000 nm, especially preferred between 100 nm and 300 nm.

The waveguiding layer as described herein may comprise additional components, such as fillers, wetting agents and the like. Such additives are known in the field and are commercially available.

Suitable parameters for the microstructured waveguiding layer are summarized below:

| Parameter | Suitable range | Preferred range | Especially preferred range |
| --- | --- | --- | --- |
| period Λ | 100-3000 nm | 300-2200 nm | 300-1700 nm |
| Thickness c * | 30-1000 nm | 50-400 nm | 100-300 nm |
| depth t | 50-600 nm | 80-400 nm | 100-200 nm |
| Fill factor f.f. | 0.1-0.9 | 0.3-0.8 | 0.4-0.7 |
| Thickness of Interface | less than 200 nm | less than 80 nm | less than 30 nm |

* Prior to embossing

Alternatively or in addition to a waveguiding layer 1 comprising nanoparticles increasing the refractive index, one or more layers 2, 4, 5 adjacent to the waveguiding layer 1 can be porous layers. Such porous layers advantageously comprise inorganic nanoparticles, preferably in combination with one or more organic binders. Suitable inorganic nanoparticles are preferably selected from the group consisting of oxides like $SiO_2$, $Al_2O_3$, AlOOH, ITO (Indium-/Tin Oxide), $TiO_2$, $ZnO_2$, $ZrO_2$, $SnO_2$. Preferred nanoparticles are precipitated or pyrogenic silicon oxide and aluminum oxide or nano-crystalline aluminum-oxide/hydroxide. For example Aerosil® 200 (Degussa AG, Germany) or Cab-O-Sol® M-5 (Cabot Corporation, USA) are suitable silicon oxide nanoparticles. Examples of suitable aluminum-oxides and aluminum-hydroxide are γ-Aluminum-oxide respectively pseudo-boehmite.

A porous layer shows a decreased refractive index due to the high content of air (with a refractive index close to 1) in the porous structures. The effective refractive index $n_{eff}$ of such layers can be approximated by a simple average model based on the refractive index of the pore matrix $n_{matrix}$ material and the refractive index of air, weighted by the corresponding volume fraction. If $v_{air}$ is the pore volume than is $n_{eff} = 1 \times v_{air} + n_{matrix}(1 - v_{air})$.

Thus, a suitable porous layer with a refractive index below 1.3 can be obtained, if the nanoparticles consist of a material with a refractive index of 1.5 and the pore volume of the porous layer is higher than 40%. A simple method to measure the pore volume is e.g. to fill the pores with a suitable solvent of known density. Based on the gain in weight of the porous layer the pore volume can be determined. Such porous layers are known from the prior art. U.S. Pat. No. 6,204,202 for example discloses porous $SiO_2$-layers with a refractive index between 1.10 and 1.40, which are manufactured in a sol-gel process at about 400° C.

The size of the inorganic nanoparticles, characterized by its average diameter $d_p$, is in the range of 5 nm to 200 nm, preferably between 10 nm and 60 nm. Further the particle size distribution should be low. Such materials are capable of forming mechanically flexible porous layers by curtain- or cascade coating a substrate.

Such nanoparticle material forms porous structures having a high content of air in said structures. The porous layers used have a volume fraction of air of at least 20%, preferably at least 40% particularly preferred of at least 60%. Such layers are obtainable e.g. according to the methods as described in EP 1464511. The meshes of the nanoparticles and the pores possess structure sizes below the micrometer range. By controlling the pore volume and the size of the structures the refractive index and the scattering properties of the layer can be tuned. Tsutsui et al ("Doubling Coupling-Out Efficiency in Organic Light-Emitting Devices Using a Thin Silica Aerogel Layer", Adv. Mater. 13, 2001, p. 1149-1152) discloses porous layers having a refractive index of 1.03.

The porous layers according to this invention consist of 0.2 g/m² to 40 g/m², preferably 1 g/m² to 30 g/m², particular preferably 2 g/m² to 20 g/m² nanoparticles. The thickness of the porous layer after drying is between 0.2 µm to 40 µm, preferably 1 µm to 30 µm, and particular preferably 2 µm to 20 µm.

A typical pore volume of a porous layer of a ZOF according to the invention is between 0.1 and 2.5 ml/g. Preferred are pore volumes between 0.2 and 2.5 ml/g, particularly preferred between 0.4 and 2.5 ml/g.

In one embodiment, organic binders are added to the nanoparticles to obtain improved porous layers. Organic binders are selected from the group consisting of unmodified natural polymers, modified natural polymers and synthetic polymers and include: partly or completely hydrolyzed polyvinyl alcohol PVA or co-polymers with vinylacetate and other monomers; modified polyvinyl alcohols; homo- or co-polymers of (meth)acrylamid; poylethylenoxide PEO; polyvinyl pyrrolidone PVP; polyvinylacetate; stark; cellulose and its derivatives, like hydroxyethylcellulose or carboxymethylcellulose; cyclodextrines; gelatine; polyurethane PU. The aforementioned polymers can also be used as mixtures (blends). Preferred polymers are modified PVA, polyvinylidenfluoride, PEO, copolymers of (meth)acrylamid and polyacrylnitrile or their mixtures.

The organic binder can be cross-linked with appropriate agents to form nearly water insoluble layers. Examples of organic cross-linking agents are aldehyde, dioxans, epoxides and reactive vinyl compounds. Inorganic cross-linking agents are for example chrome alum, aluminum alum or boric acid. Other possible agents are UV active molecules. The concentration of this binder must be kept as low as possible to maintain the pore structure. On the other hand it must ensure a stable and flexible porous coating that sticks well enough to the substrate. Up to 60% binder based on the amount of nanoparticles in the layer can be used. Preferred are 0.5% to 30%, and particularly preferred are 0.5% to 5% of binder.

The surface of the nanoparticles may be modified, in order to obtain a positively or negatively charged surface. A preferred method to obtain a positively charged surface of silica nanoparticles is to modify the particles with Polyaluminium-hydroxychloride as described in DE 10020346. Such modifications can improve the rheological properties of the aqueous dispersions containing the nanoparticles.

One or more salts of rare earth metals (e.g. salts of Lanthan) may be added to the porous layer. The porous layer may contain 0.4 to 2.5 mol percent of said salts. Optionally, further additives are added to the porous layer to improve its properties. The inorganic nanoparticles, binders, rare earth salts and additives are commercially available or obtainable according to known methods.

A porous layer containing nanopores can also be formed in a matrix that does not comprise nanoparticles, such as foams. Gel-based processes can be used for manufacturing such layers as described e.g. in the U.S. Pat. No. 6,204,202.

The substrate of a ZOF according to the invention can be made of any suitable material known to the skilled person. The selection of the substrate depends on the intended use of the ZOF, and the manufacturing process of the ZOF. Substrates may e.g. be made of glass, paper, or polymer foils. Advantageously, transparent and flexible polymer foils are used. Such foils can be selected from the group consisting of Cellulose esters (like Cellulosetriacetate, Celluloseacetate, Cellulosepropionate or Celluloseacetate/butyrate), Polyesters (like Polyethylen terephthalate PET or Polyethylen naphthalate PEN), Polyamides, Polycarbonates PC, Polymethyl-metacrylates PMMA, Polyimides PI, Polyolefins, Polyvinylacetates, Polyethers, Polyvinylchloride PVC and Polyvinylsulfone PSU. Preferred are Polyesters, particularly Polyethylenterephthalate like Mylar® (DuPont) or Polyethylennaphthalate, due to their exceptional stability. Suitable opaque flexible substrates are for example Polyolefin coated paper and white opaque Polyester like Melinex® (DuPont).

The refractive index of the substrate can e.g. be in the range of 1.35 to 1.80, but typically it is between 1.49 (PMMA) and 1.59 (PC). The thickness of the substrate depends on the intended use of the ZOF manufactured, and on the equipment used; it is preferably between 25 µm and 200 µm. In a preferred embodiment, the substrate is "flexible"; this relates to the bending properties, in particular to enable a roll-to-roll process for manufacturing a ZOF.

Optionally, the adhesion properties of the substrate may be improved by chemical or physical methods. Chemical methods include the deposition of a bonding agent, e.g. deposition of terpolymers of vinylidenchloride, acrylnitril and acrylic acid or of vinylidenchloride, methylacrylate and itaconic acid. Physical methods include plasma treatment like corona treatment.

The substrates described above are commercially available or obtainable according to known methods.

Optionally, a ZOF according to the invention may comprise one or more covering layers 4, deposited on top of the waveguiding layer 1. The covering layer 4 can be made of any suitable material. To keep the waveguiding properties of the waveguiding layer 1 with index of refraction $n_1$, the covering layer 4 must have a refractive index $n_4 < n_1 - 0.2$. The selection of the material for the covering layer depends on the intended use of the ZOF and the manufacturing process of the ZOF. Suitable are e.g. the same polymers that can be used for manufacturing the waveguiding layer 1. Furthermore, the same porous materials can be used as for the second layer 2 (see resulting ZOF in FIG. 2).

Optionally, one or more additional layers are included to the ZOF according to the invention, for accommodating specific uses or needs. Such layers may e.g. be release layers or adhesive layers. Adhesive layers may be deposited as a top layer on the ZOF, on the side opposite to the substrate 3. A release layer may be a first layer on top of the substrate 3.

Such layers, their materials and production are known in the field. Preferably, the manufacture of such layers is included in a roll-to-roll process. Depending on the ZOF manufactured, such additional layers need to be transparent and may require sharp interfaces. Usually, such additional layers comprise water soluble or water dispersible polymers as defined above, and additives.

Manufacture of ZOFs According to the Invention

A method for manufacturing ZOFs according to the invention comprises the simultaneous or subsequent deposition of layers on a substrate. Preferred deposition methods are coating methods, in particular liquid coating methods. Such techniques include dip coating, rod coating, blade coating, gravure coating, spray coating, curtain coating, cascade coating, or other generally applied coating methods; particular preferred techniques are curtain coating and cascade coating. Preferably water based coating techniques are applied.

In one variant of the method, said first and second layer are deposited in two separate coating steps, preferably two separate liquid coating steps.

In an advantageous embodiment of the manufacturing method, all deposition steps are adapted to fit into a roll-to-roll process. The coating speed in said roll-to-roll process is for the preferred curtain coating in the range of 30 to 2000 m/min, preferred between 50 and 500 m/min, particularly preferred between 150 and 300 m/min.

A first method suitable for low costs roll-to-roll mass production of ZOF according to the invention is illustrated in FIGS. 2(a) and (b). In brief, the process comprises at least two water based coating steps, followed by an embossing step, and optional further deposition, drying and/or cross-linking steps.

Figure 2:
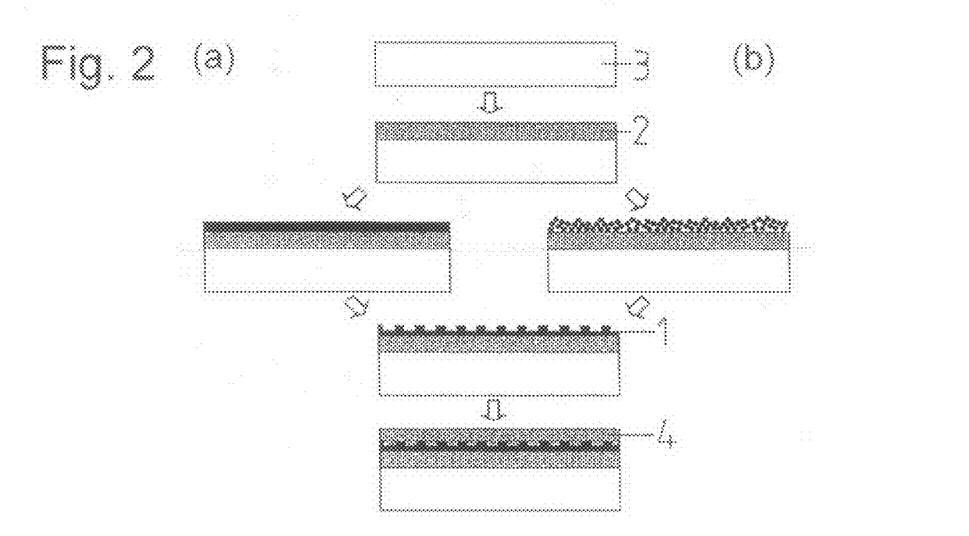
FIG. 2 shows schematically a manufacturing process according to the invention.

In a first step a porous layer 2 is deposited on a flexible substrate 3 with a refractive index $1.35 < n_{substrate} < 1.80$, the porous layer having a refractive index $n_2 < n_{substrate} - 0.2$. The substrate may be transparent or opaque. The layer 2 is deposited by a water based coating technique from an aqueous dispersion containing inorganic nanoparticles. Optionally, an organic binder or other additives are added to the dispersion. The porous layer obtained is dried, e.g. by air fans, infrared radiation or microwave radiation. The drying is done preferred in an air flow with a temperature below 60° C. Preferably, the drying is carried out immediately after deposition.

In a next step, a polymer layer 1 with a refractive index $n_1$ at least 0.2 higher than that of the porous layer 2 is deposited on the porous layer 2. This polymer layer 1 will later act as an optical waveguide (waveguiding layer 1). The deposition is done by a water based coating technique. The polymer may either be a water-soluble polymer, as illustrated in FIG. 2(a), or a water-dispersible polymer, as depicted in FIG. 2(b). After deposition the waveguiding layer 1 is dried. If the requirements concerning the indices of refraction of the layers, the layer thickness, and the sharpness of the interface are fulfilled, thin film interference effects are visible or measurable. This effect may serve as a quality control.

In a subsequent step, diffractive microstructures are embossed in the waveguiding layer 1, with an embossing tool, e.g. a nickel shim. The embossing may be carried out at elevated temperature and/or with UV-illumination ("hot"- and "UV"-embossing). Typically hot-embossing is done at a temperature above the glass transition temperature of the waveguiding layer 1. Optionally, a hardening of the polymer layer may be applied. It is believed that such hardening protects the embossed microstructures from deterioration by swelling of the waveguiding layer 1 during the following additional coating steps. The polymer chains can be cross-linked by chemical treatment, thermal treatment or irradiation, (e.g. UV irradiation) to enhance the stability of this layer against solvents (like water) and/or mechanical stress. This can be realized by incorporating appropriate additives in the waveguiding layer or by covalently linking cross-linkable groups to the polymer. The cross linking is preferably done during or after the embossing step. If a UV-curable material is used for the waveguiding layer 1 that keeps the embossed microstructure for a short duration after removal of the embossing tool, the hardening step by UV-illumination can carried out separately from the embossing step, e.g. in an adjacent unit of the roll-to-roll system. This reduces the complexity of the machine and therefore also the manufacturing cost. If a thermal cross-linking material is used for cross-linking the polymer layer, and the hot embossing is done at sufficient high temperatures, the cross-linking can be achieved already during the embossing step. Thus, no separate cross-linking step is needed.

Some water based coating techniques are capable of coating several layers simultaneously. However, the coating of the low and the high refractive index layer (second layer 1 and waveguiding layer 2 as defined above) in two steps is preferred. The two step process usually results in a sharper interface between the porous layer 2 and the waveguiding layer 1. Without being bound to theory, it is believed that a sharp interface between the layers is important to ensure a sufficient waveguiding of the incident light in the polymer layer.

Optionally, one or more, preferably one, additional covering layer 4 with a refractive index $n_4 < n_1 - 0.2$, is deposited on the obtained layer stack. Details on the covering layer 4 are given above. Suitable deposition methods are described previously in context with manufacturing the other layers. The suitable thickness range for the covering layer 4 is the same as for the porous layer 2.

To obtain a flat surface that can be used to laminate the ZOF to other substrates, a further additional polymer layer can be deposited (not shown in FIG. 2). If this layer has no waveguiding function the interface to the covering layer 4 needs not to be very sharp. Thus, the covering layer and this further polymer layer can be coated in one run, which reduces the production costs.

Figure 3:
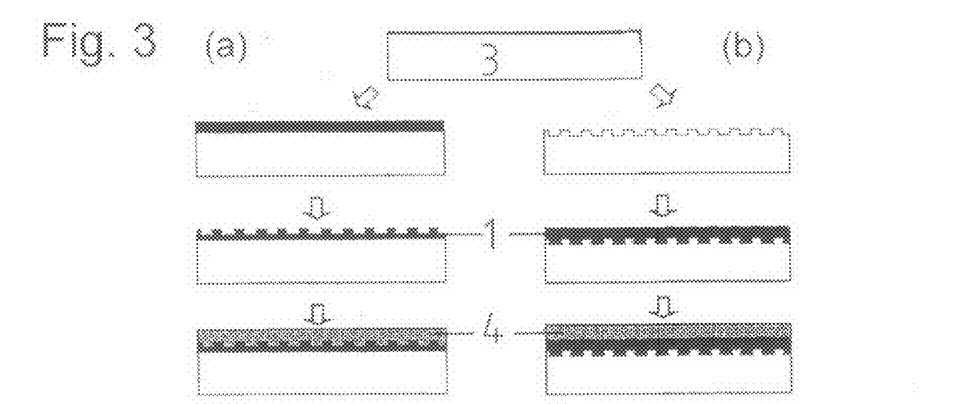
FIG. 3 shows schematically another variant of a manufacturing process according to the invention.

Another variant of method according to the invention suitable for low cost roll-to-roll mass production of ZOFs according to the invention is illustrated in FIG. 3. In short, this method consists of at least one water based coating step and one embossing step. The embossing can be carried out prior to the coating step(s) (FIG. 3(b)) or after the deposition of the waveguiding layer 1 (FIG. 3(a)). Optionally, additional coating steps are possible. The coating speed in said roll-to-roll process is for the preferred curtain coating in the range of 30 to 2000 m/min, preferred between 50 and 500 m/min, particularly preferred between 150 and 300 m/min.

Referring to FIG. 3(a), in a first step a waveguiding layer 1 is deposited on a flexible substrate 3 with a refractive index $n_{substrate}$ between 1.35 and 1.80, the waveguiding layer 1 having a refractive index $n_1 > n_{substrate} + 0.2$. The substrate may be transparent or opaque. The layer 1 is deposited by a water based coating technique from an aqueous dispersion or an aqueous solution. The thickness of the polymer layer, which acts as a waveguide, is in the range of 50 nm to 1000 nm, preferred between 100 nm and 300 nm. It is dried after deposition, preferably immediately after deposition.

In a next step, the diffractive microstructure needed for the function of the ZOF is embossed in the waveguiding layer 1 as described above. To enhance the stability of this layer against solvents and/or mechanical stress the polymer chains can be cross-linked as described above. Optionally, an additional covering layer 4 may be deposited as a protective top coat by water based coating techniques. This layer 4 can be a porous or a polymer layer, and must have a refractive index $n_4$ that is distinctly lower than the one of the adjacent waveguiding layer 1, $n_4 < n_1 - 0.2$. The details relating to the covering layer 4 and its manufacture are given above. The same considerations to the optional further polymeric top coat are applicable likewise.

In a further variant, referring to FIG. 3(b), the embossing step is done first. Thus, the diffractive microstructure is embossed, preferably hot-embossed, directly on the substrate 3, or in an embossable layer deposited on the substrate. Next, the waveguiding layer 1 is deposited on the microstructured substrate 3, by a water based coating technique. The same considerations regarding the indices of refraction of all layers 3, 1, 4 are applicable as for the method described above with FIG. 3(a). Depending i) on the viscosity of the aqueous solution or dispersion, ii) the dried layer thickness, and iii) the depth of the microstructure, the top surface of the polymer layer is flat (as shown in FIG. 3(b)) or has a grating structure correlated to the microstructure of the substrate. Optionally, on top of the waveguiding layer 1 an additional covering layer 4 with refractive index at least 0.2 lower than the refractive index of the waveguiding layer 1 may be deposited. One function of this porous (or polymer) layer 4 is to protect the waveguiding layer 1 against environmental influences and mechanical stress. Optionally, an additional polymer top coat (not shown) may be deposited, as described before. The possible materials for the substrate and the layers are the same as discussed in the context of FIGS. 2 and 3(a).

In yet another embodiment of the manufacturing method according to the invention a stack of alternating layers with high and low refractive index is deposited by water based coating techniques, whereas the high refractive index layers act as optical waveguides and are embossed with the zero-order microstructure.

In a further variant of both manufacturing methods, as shown in FIGS. 2 and 3, the coated and micro-structured foil (i.e. the manufactured ZOF) is used to manufacture adhesive tags or labels bearing the color effect of the ZOF. For this purpose, the uncoated side of the substrate or the top coat of the layer stack is provided with an adhesive layer and a removable carrier protecting the adhesive layer. The latter can be e.g. silicon coated paper, or polymeric foil. The substrate 3 with the coated layer stack is then sliced such that tags or labels of the desired size can be stripped of the carrier and applied to products, packages and the like. The known techniques of labeling tags with additional information like batch number, company logo and the like can be applied to a ZOF foil manufactured according to the invention.

In another embodiment of both production methods, one additional release layer is deposited between the substrate 3 and the first coated layer 2 or 1, and one additional adhesive layer (such as a thermo-activateable adhesive layer) is deposited as top layer.

This enables a separation of the coated layer stack from the substrate and to transfer the obtained ZOF to another surface. With this method, it is possible to manufacture a ZOF that is transferable to the surface of another device such as a package, banknote, security device, e.g. by a lamination process or a hot stamping process. A ZOF according to this embodiment is distinctly thinner compared to a ZOF which is glued with an adhesive to a product or a package and the like according to the embodiment described before.

In the manufacturing processes discussed so far the roll-to-roll coating techniques are water-based. Alternatively also coating techniques based on other solvents may be used. However, the water-based processes are preferable, since they are more environmentally friendly, and simple, as hazardous solvents are avoided for coating and structuring. Furthermore no expensive vacuum processes are needed.

The present invention provides methods of mass-producing such ZOFs using hot-embossing or UV-embossing. Again, this provides a process that is environmentally friendly, simple and fast. Further, such a process is compatible with standard equipment, which provides reliability and also reduces investment costs.

ZOFs according to the invention may be used for security devices in the fields of authentication, identification, and security, for a variety of purposes like (but not restricted to) banknotes, credit cards, passports, tickets, document security, anti-counterfeiting, brand protection and the like. Another field of use for such ZOFs, taking the benefit of its color effects, are marketing devices, e.g. in the application of adhesive labels, product packaging and the like.

Without a covering coating 4 the waveguiding layer 1 is located at the surface of the coated substrate, with air as the second adjacent material to the waveguiding polymer layer 1. Such a ZOF is sensitive to touch and other mechanical stress. This can be used e.g. either to visualize if and where packages were touched, and/or for marketing purposes. Furthermore it prevents that packages can be reused several times. This is important for example to suppress illegal re-import of products like pharmaceuticals, which are often repacked in used packages.

However, for most applications, additional protective coatings are useful and are thus preferred. An additional function of the covering layer is to hamper attempts to analyze the diffractive microstructure.

In a further embodiment, the present invention provides ZOFs, as described herein, which are in the form of hot or cold transferable labels, adhesive tags, and the like.

In a further aspect, the present invention relates to the use of inorganic nanoparticles in the manufacture of a ZOF as described herein. Said inorganic nanoparticles may be used for forming layers having a low refractive index; in particular in forming porous layers. They may also be used for forming layers having a high refractive index; in particular in forming waveguiding layers.

To further illustrate the invention, the following examples are provided, with no intention to limit the scope of the invention.

EXAMPLE 1

A first layer was deposited by curtain coating on a transparent PET substrate with a thickness of about 200 µm. The employed solution had a composition as described in table 2. After drying, the thickness of the first layer is approximately 8 µm. The surface modified $SiO_2$ is obtained according to example 1 of EP 1655348. Next, a second layer was curtain coated in a second coating step from a solution according to table 3. The dried layer thickness is about 200 nm to 240 nm. Blue to violet interference colors are visible, which are believed to be due to the differences in the refractive index of both layers, the sharp interface between both layers and the adequate polymer layer thickness. All coating steps took place in a continuous roll-to-roll process using a curtain coating machine. Next, a linear grating structure with a period of 1050 nm, a grating depth of 200 nm and a rectangular grating profile was hot embossed in the second layer at 110° C. Viewed at an angle of $\Theta=50°$ the obtained ZOF shows a pronounced color change upon rotation by 90°.

TABLE 2

| First layer (Low refractive index, porous) | |
|---|---|
| component | amount [g/m$^2$] |
| Surface modified SiO2 | 6.000 |
| Polyvinyl alcohol, Mowiol 40-88, Omya AG, Switzerland | 1.300 |
| Hardener, Boric acid, Schweizerhalle Chemie AG, Switzerland | 0.229 |
| total (solid) | 7.529 |
| Water | 40.284 |
| Total (solution) | 47.529 |

TABLE 3

| Second Layer (High refractive index) | |
|---|---|
| component | amount [g/m$^2$] |
| Polyvinyl alcohol, Mowiol 56-98, Omya AG, Switzerland | 0.240 |
| Total (solid) | 0.276 |
| Water | 32.724 |
| Total (solution) | 32.964 |

EXAMPLE 2

A first layer was deposited by curtain coating on a transparent PET substrate with a thickness of about 200 μm. The employed solution had a composition as described in table 4. The surface modified $SiO_2$ is obtained according to example 1 of EP 1655348. Next, a second layer including polymer particles was curtain coated in a second coating step from a solution according to table 5. All coating steps took place in a continuous roll-to-roll process using a curtain coating machine. Next, a linear grating structure with a period of 1050 nm, a grating depth of 200 nm and a rectangular grating profile was hot embossed in the second layer at 80° C. Viewed at an angle of $\Theta=50°$ the obtained ZOF shows a pronounced color change upon rotation by 90°.

TABLE 4

First layer (Low refractive index, porous)

| component | amount [g/m²] |
|---|---|
| Surface modified SiO2 | 21.052 |
| Polyvinyl alcohol, Mowiol 40-88, Omya AG, Switzerland | 4.928 |
| Hardener, Boric acid, Schweizerhalle Chemie AG, Switzerland | 0.8 |
| total (solid) | 26.78 |
| Water | 157.3 |
| Total (solution) | 184.08 |

TABLE 5

Second Layer (High refractive index)

| component | amount [g/m²] |
|---|---|
| Polyvinyl alcohol, GOHSEFIMER K-210, Nippon Synthetic Chemical Industry Ltd., Japan | 0.07 |
| Latex Jonrez E2001, MeadWestvaco Corporation, USA | 0.93 |
| Total (solid) | 1.00 |
| Water | 23.964 |
| Total (solution) | 24.964 |

LIST OF REFERENCE SYMBOLS 1 first layer/waveguiding structure
2 second layer/porous layer
3 substrate
4 covering layer
5 surrounding second layer/matrix

The invention claimed is:

1. A Zero-order diffractive filter comprising:
   a first layer comprising a periodic diffractive microstructure having a period that is between 100 nm and 3000 nm; and
   at least one second layer, wherein said at least one second layer has an effective index of refraction $n_{eff}$ of less than 1.4;
   wherein said first layer has a refractive index that is higher than the refractive index of said at least one second layer by at least 0.2;
   wherein at least one of said at least one second layer is a porous layer comprising an agglomeration of inorganic nanoparticles of 0.2 g/m² to 40 g/m² forming air-filled interstitial spaces between neighboring inorganic nanoparticles; and
   wherein said interstitial spaces are nanopores of said porous layer, said nanopores having a pore volume of at least 20% of the entire volume of said porous layer.

2. The zero-order diffractive filter according to claim 1, wherein said first layer consists of a polymer matrix containing nanoparticles, said nanoparticles having a refraction index that is higher than the refraction index of said polymer matrix.

3. The zero-order diffractive filter according to claim 1, wherein said porous layer comprising said nanopores consists of a foam.

4. The zero-order diffractive filter according to claim 1, wherein said porous layer has a refraction index of <1.35.

5. The zero-order diffractive filter according to claim 1, wherein said first layer is adjacent to a substrate.

6. The zero-order diffractive filter according to claim 5, wherein said substrate comprises said periodic diffractive microstructure.

7. The zero-order diffractive filter according to claim 5, wherein said substrate is releasable.

8. The zero-order diffractive filter according to claim 1, wherein said at least one second layer is adjacent to a substrate.

9. The zero-order diffractive filter according to claim 1, comprising a covering layer.

10. A process for manufacturing a zero-order diffractive filter according to claim 1, comprising the steps:
    deposition of a porous layer with an refractive index $n_2$ on a flexible substrate, preferably by a water based coating technique;
    deposition of a polymer layer with refractive index $n_1 > n_2 + 0.2$ on the porous layer, preferably by a water based coating technique; and
    forming a zero-order diffractive micro-structure in the polymer layer, preferably by embossing.

11. The process according to claim 10, wherein subsequently an additional covering layer with a refractive index $n_4 < n_1 - 0.2$ is deposited on the polymer layer, preferably by a water based coating technique.

12. The process according to claim 10, wherein a porous layer and/or a porous covering layer has a refractive index <1.35.

13. The process according to claim 10, wherein all deposition steps are part of a roll-to-roll process.

14. The, zero-order diffractive filter obtained by a process according to claim 10.

15. A method for manufacturing a security device, in particular for the use with banknotes, credit cards, passports, tickets and for brand protection purposes, using a zero-order diffractive filter according to claim 14.

16. A method using inorganic nanoparticles for manufacturing a zero-order diffractive filter according to claim 14.

17. A process for manufacturing a zero-order diffractive filter according to claim 1, comprising the steps:
    deposition of a polymer layer with refractive index $n_1$ on a substrate with refractive index $n_3 < n_1 - 0.2$, preferably by a water based coating technique;
    forming a zero-order diffractive micro-structure in the polymer layer, preferably by embossing; and
    deposition of an additional porous covering layer with a refractive index $n_4 < n_1 - 0.2$ on the polymer layer, preferably by a water based coating technique.

18. The process according to claim 17, wherein a porous layer and/or a porous covering layer has a refractive index <1.35.

19. The process according to claim 17, wherein all deposition steps are part of a roll-to-roll process.

20. The zero-order diffractive filter obtained by a process according to claim 17.

21. A method for manufacturing a security device, in particular for the use with banknotes, credit cards, passports, tickets and for brand protection purposes, using a zero-order diffractive filter according to claim 20.

22. A method using inorganic nanoparticles for manufacturing a zero-order diffractive filter according to claim 20.

23. A process for manufacturing a zero-order diffractive filter according to claim 1, comprising the steps:
 forming a zero-order diffractive micro-structure in a flexible substrate with refractive index $n_3$;
 deposition of a polymer layer with refractive index $n_1 > n_3 + 0.2$ on the substrate, preferably by a water based coating technique; and
 deposition of an additional porous covering layer with a refractive index $n_4 < n_1 - 0.2$ on the polymer layer, preferably by a water based coating technique.

24. The process according to claim 23, wherein a porous layer and/or a porous covering layer has a refractive index <1.35.

25. The process according to claim 23, wherein all deposition steps are part of a roll-to-roll process.

26. The zero-order diffractive filter obtained by a process according to claim 23.

27. A method for manufacturing a security device, in particular for the use with banknotes, credit cards, passports, tickets and for brand protection purposes, using a zero-order diffractive filter according to claim 26.

28. A method using inorganic nanoparticles for manufacturing a zero-order diffractive filter according to claim 26.

29. A method for manufacturing a security device, in particular for the use with banknotes, credit cards, passports, tickets and for brand protection purposes, using a zero-order diffractive filter according to claim 1.

30. A method using inorganic nanoparticles for manufacturing a zero-order diffractive filter according to claim 1.

31. The zero-order diffractive filter according to claim 1, comprising an interface between said first layer and said at least one second layer, said interface having a thickness of less than 200 nm.

32. The zero-order diffractive filter according to claim 1, wherein said assembly of inorganic nanoparticles are in combination with at least one organic binder.

33. The zero-order diffractive filter according to claim 1, wherein the surface of said inorganic nanoparticles is modified to obtain at least one of a positive or negative charge to improve the rheological properties of said inorganic nanoparticles.

34. The zero-order diffractive filter according to claim 1 comprising a substrate, wherein said substrate comprises said periodic diffractive microstructure, and said substrate is releasable.

* * * * *